United States Patent Office 3,091,624
Patented May 28, 1963

---

3,091,624
PROCESS FOR PRODUCING ARENE METAL CARBONYLS
Roy L. Pruett, Charleston, W. Va., John E. Wyman, Topsfield, Mass., and Leo Parts, Snyder, N.Y., assignors to Union Carbide Corporation, a corporation of New York
No Drawing. Filed Oct. 16, 1959, Ser. No. 846,804
10 Claims. (Cl. 260—429)

This invention relates to organo-metallic carbonyls. More particularly, this invention relates to a process for producing arene metal carbonyls. This application is a continuation-in-part of copending application Serial No. 760,540, filed September 12, 1958, and now abandoned.

Bis(arene)organo-metallic compounds in which two aromatic hydrocarbon groups are bonded to each metal atom, for example bis(toluene)chromium and bis(benzene)molybdenum, have been prepared. Such compounds and a method for their production are described in several published articles by E. O. Fischer and co-workers. See, for example, Z. Naturforshung 10(b), 665 (1955); Chem. and Ind. 1956; Z. Anorg. Allgem. Chem. 286, 142 (1956); ibid. p. 146; Ber. 89, 1805 (1956); ibid, p. 1809; ibid, p. 2397; Angew. Chem. 68, 462 (1956); Ber. 90, 1725 (1957); and Ber. 90; 250 (1957).

We have now discovered a process for producing organo-metallic compounds wherein only one arene organic group is bonded to each metal atom. The compounds produced by the process of this invention are arene hydrocarbon metal carbonyls, for example ditoluene divanadium hexacarbonyl, benzene chromium tricarbonyl and ditoluene dimanganese tetracarbonyl. These arene metal carbonyls may be characterized as addition compounds in contrast to organo-metallic substituted compounds. In the latter, a hydrogen or other substituent in the organic nucleus is substituted or removed in the formation of the organo-metallic compound. However, no hydrogen, alkyl or other substituent is removed from or replaced on the arene organic moiety in the preparation of arene metal carbonyls by the process of the present invention.

According to the process of this invention, a bis(arene hydrocarbon) metal compound is contacted with carbon monoxide at a suitable temperature to produce an arene metal carbonyl. For example, contacting bis(toluene) chromium with carbon monoxide results in the formation of toluene chromium tricarbonyl, $(CH_3C_6H_5)Cr(CO)_3$.

The bis(arene hydrocarbon) metal compounds which may be used in the process of the present invention may be represented by the formula

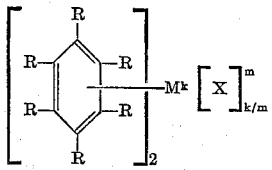

wherein M is a transition metal which forms a bis(arene hydrocarbon) metal compound; each R is a group selected from the class consisting of hydrogen, alkyl, aryl, aralkyl, and alkaryl, X is an anion; $k$ is the ionic charge of the bis(arene hydrocarbon) metal cation and has the values 0, 1 and 2; $m$ is the ionic charge of the anion X; and $k/m$ is the number of anions bonded to the cation. When $k$ is 0, the bis(arene hydrocarbon) metal compound is uncharged, that is, non-ionic and there is no anion X; when $k$ is 1 or 2, the bis(arene hydrocarbon) metal moiety is a cation and the presence of an anion is required to balance the cationic charge. Examples of the anion X are chloride, bromide, hydroxide, acetate, chloroacetate, tetraphenylboron, reineckate, tetrabromoaluminate and picrate ions.

The above formula requires that the benzene nucleus which is bonded to the metal atom be an unfused benzene ring and that there be no unsaturated aliphatic substituents on the ring. Thus, the organic group in the above formula may not be naphthalene or styrene.

The bonding between the metal atom and the arene hydrocarbon group takes place through the six electrons of the benzene ring system of the arene hydrocarbon. This type of bonding is discussed in more detail in an article by E. O. Fischer and H. P. Kögler, "Angew. Chem." 68, 462 (1956). The substituents on the benzene ring system of the arene hydrocarbon must, therefore, be of such size and number that the arene hydrocarbon may approach the metal atom sufficiently closely to permit stable bond formation to take place. For example, tertiary-butylbenzene chromium tricarbonyl and hexamethylbenzene chromium tricarbonyl are stable compounds which may be prepared by the process of this invention but 1,3,5-tritertiary-butylbenzene chromium tricarbonyl is too unstable to permit isolation or identification because the three bulky tertiary butyl groups do not permit the benzene ring system of the arene hydrocarbon to approach the chromium atom sufficiently closely for bond formation to take place.

The process of the present invention, therefore, contemplates the production of stable arene metal carbonyls and it is understood that the starting materials for the process are stable bis(arene hydrocarbon) metal compounds and that the products are stable arene metal carbonyls which can be isolated or identified.

In general, the metals which form bis(arene hydrocarbon) metal compounds are those in groups V–B, VI–B, VII–B and part of group VIII in the periodic classification of the chemical elements as set forth in the Handbook of Chemistry and Physics, 40th ed., Chemical Rubber Publishing Company, pages 448 and 449. The group VIII elements which form such compounds are iron, ruthenium, osmium, cobalt, rhodium and iridium. Of the transition elements which form bis(arene hydrocarbon) metal compounds, only the metals of groups V–B and VI–B form uncharged (non-ionic) compounds. Examples of the compounds represented by the above formula which may be used in the process of the invention are bis-(toluene) vanadium, $(CH_3C_6H_5)_2V$; bis(tetrahydronaphthalene) chromium; bis(toluene) chromium hydroxide, $(CH_3C_6H_5)_2CrOH$; bis(diphenyl)ruthenium di(tetraphenylborate), $[(C_6H_5C_6H_5)_2Ru][C_6H_5)_4B]_2$; bis(mesitylene) iron dibromide and bis(mesitylene)cobalt ditetrabromoaluminate. The bis(arene hydrocarbon) metal compounds represented by the above formula may be prepared by the methods described in the published articles by E. O. Fischer and coworkers referred to hereinabove.

The process of the present invention may therefore be represented by the equation:

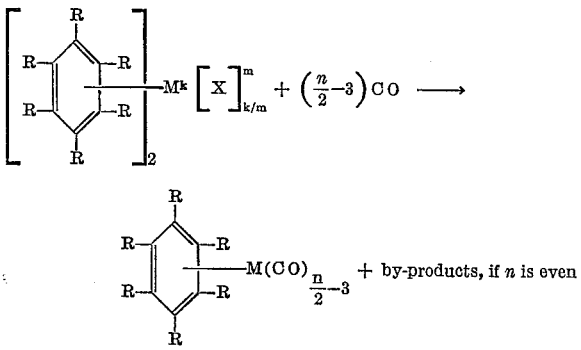

and by the equation:

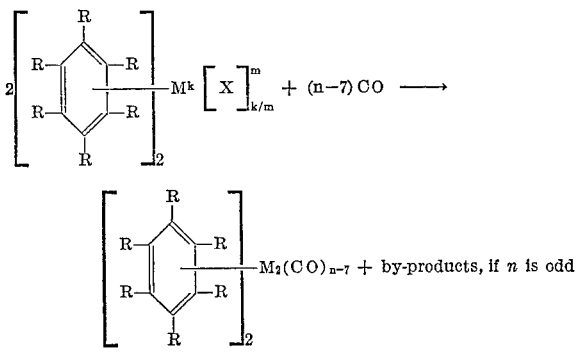

wherein R, M, X, $k$ and $m$ have the meanings defined hereinabove, $n$ is an integer defined by the equation $n = G - A$, A is the atomic number of M and G is the atomic number of the next higher rare gas. That is, $n$ is equal to the difference between the atomic number of the rare gas next above M in the periodic classification of the chemical elements and the atomic number of M. The by-products in the process represented by the above equation comprise organic residues derived from the bis-(arene) metal compound or the anion X and inorganic residues derived from the anion X and the metal atom of the bis(arene)metal compound. For example, if M is vanadium, all the R groups are hydrogen and $k$ is zero, then G is equal to 36 (the atomic number of the rare gas krypton), A is equal to 23 (the atomic number of vanadium), $n$ is equal to 13 and the equation becomes $$2(C_6H_6)_2V + 6CO \rightarrow (C_6H_6)_2V_2(CO)_6 + \text{by-products}$$

Similarly, if M is ruthenium, all the R groups are hydrogen, X is the bromide ion, $k$ is equal to 2 and $m$ is equal to 1, then $n = 54 - 44 = 10$ and the equation becomes $$(C_6H_6)_2RuBr_2 + 2CO \rightarrow (C_6H_6)Ru(CO)_2 + \text{by-products}$$

For the particular embodiment where the starting material is an uncharged bis(arene hydrocarbon) compound of a group V-B or VI-B transition metal, the process of this invention may be represented by the equation

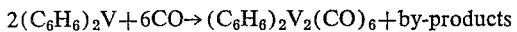

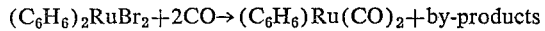

where M is a metal from group V-B and R has the meaning defined hereinabove and by the equation

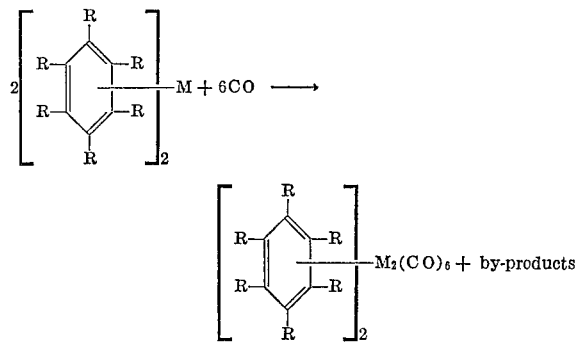

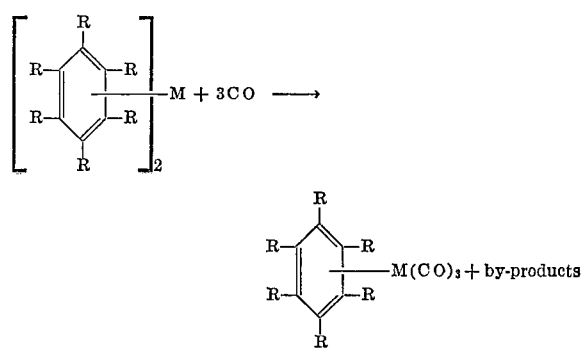

where M is a metal from group VI-B and R has the meaning defined hereinabove.

Additional examples of the process of this invention are the reactions of: bis(ortho-xylene) tungsten with carbon monoxide to give ortho-xylene tungsten tricarbonyl; bis(ethyl benzene) molybdenum with carbon monoxide to give ethyl benzene molybdenum tricarbonyl; bis(hexamethylbenzene) chromium with carbon monoxide in heptane solvent to give hexamethylbenzene chromium tricarbonyl; bis(benzene) rhenium tetraphenyl boron to give dibenzene dirhenium tetracarbonyl; bis(mesitylene) iron dibromide with carbon monoxide to give mesitylene iron dicarbonyl; bis(diphenyl) chromium with carbon monoxide to give diphenyl chromium tricarbonyl and bis(mesitylene) cobalt ditetraphenyl boron with carbon monoxide to give dimesitylene dicobalt dicarbonyl.

Preferably, the reaction between the bis(arene hydrocarbon) metal compound and carbon monoxide may be carried out in an inert organic liquid reaction medium and the solvent most preferred is the same organic compound which forms the organic moiety of the organometallic reactant. For example, the reaction between bis(benzene) vanadium and carbon monoxide is preferably carried out using benzene as the solvent.

The temperatures at which the reaction may be carried out vary over a considerable range of from about $-50°$ C. to about 350° C. For compounds of the group VI-B metals, chromium, molybdenum and tungsten, this temperature range is from about 40° C. to about 350° C. For compounds of the group V-B, VII-B and VIII metals, the operable temperature range is from about $-50°$ C. to about 55° C. At temperatures above about 55° C. the yield of arene metal carbonyl decreases rapidly and increasing amounts of side product metal carbonyls are formed. Temperatures above the decomposition temperature of the product in the reaction medium or of the bis(arene) metal reactant are to be avoided. Generally, temperatures in the range of about 200° C. to 300° C. are preferred for group VI-B metals and in the range of about 35° C. to 45° C. are preferred for the other metals.

Gaseous carbon monoxide is employed in the process at superatmospheric pressure, preferably substantially above 15 pounds per square inch gauge (p.s.i.g.). Optimum pressure is greater than about 200 p.s.i.g. for a high yield or organometallic carbonyl. If desired, the carbon monoxide may be diluted with another gas such as hydrogen.

The ratio of reactants is somewhat critical for group VI-B elements and approximately stoichiometric equivalents should be used because the presence of an excess of carbon monoxide for an extended reaction time, particularly at higher temperatures, results in the formation of a metal hexacarbonyl rather than the required product. For the group V-B, VII-B and VIII elements the ratio of reactants is not critical, although approximately stoichiometric equivalents are preferred. A large excess of carbon monoxide for an extended reaction time causes reduced yields through decomposition of the desired product and the formation of side products.

The time employed for carrying out the reaction to form the organo-metallic carbonyl may vary over wide limits depending on the temperature and pressure employed. Generally, it is preferred to maintain the reactants under desired conditions for at least 15 minutes. If stoichiometric amounts of reactants are used, then a reaction time of several hours is not detrimental.

The reaction between an ionic bis(arene hydrocarbon) metal moiety and carbon monoxide is preferably carried out in the presence of an additional reducing agent, for example an active metal such as aluminum, magnesium or zinc. For example, the reaction of bis(toluene) chromium hydroxide with carbon monoxide to produce toluene chromium tricarbonyl is preferably carried out by contacting the bis(arene) chromium hydroxide with carbon monoxide and with finely divided zinc.

The following examples illustrate the process of this invention:

Example I

A solution of 4.0 grams of bis(toluene) chromium in 200 milliliters of argon purged toluene was placed in a 300 milliliter stainless steel autoclave and the vessel was closed. These operations were conducted under an argon atmosphere, excluding air and moisture. The vessel was pressurized with 250 p.s.i.g. carbon monoxide and rocked at 275° for 8.5 hours. After cooling to room temperature, only a slight amount of carbon monoxide remained in the vessel; the pressure was vented and the contents removed and filtered. The solution was then evaporated under partial vacuum. The residue from the evaporation of the toluene was identified as toluene chromium tricarbonyl.

Toluene chromium tricarbonyl is an air stable, yellow crystalline solid, M.P. 80°–80.5° C., which decomposes at 180–190° C. It is soluble in organic solvents such as benzene, chloroform, ether, and heptane.

Example II

A solution of 8.0 grams of bis(toluene) chromium in 200 milliliters of nitrogen-purged toluene was placed in a 300 milliliter stainless steel autoclave and the vessel was closed. These operations were conducted in a nitrogen atmosphere excluding air and moisture. The vessel was pressurized with 400 p.s.i.g. carbon monoxide and rocked at 275° C. for 8 hours. After cooling to room temperature, only a slight pressure of carbon monoxide remained in the vessel. The pressure was released and the contents removed and filtered. Solvent was removed from the filtrate under a partial vacuum and the residue was purified by sublimation at 70° C. and about 1.0 micron pressure to yield 6.1 grams of yellow toluene chromium tricarbonyl. This represents a 79 percent yield based on bis(toluene) chromium.

Example III

About 2 grams of bis(cumene) vanadium dissolved in cumene is placed in a steel pressure vessel and the vessel closed. Carbon monoxide is then added to a pressure of 700 p.s.i.g. and the vessel while rocking is heated to about 55° C. After about two hours in this temperature the vessel is cooled and the excess pressure vented. The contents of the vessel are filtered and the cumene is evaporated from the filtrate under reduced pressure. Dicumene divanadium hexacarbonyl may then be isolated from the filtrate residue.

In a similar manner dihexamethylbenzene divanadium hexacarbonyl is prepared using bis(hexamethylbenzene) vanadium as the starting material and heptane as the solvent.

Example IV

Following the procedure of Example I, a solution of 14.6 grams of bis(cumene) chromium in 200 milliliters of cumene (isopropylbenzene) was employed and the vessel was rocked at 250° C. for three hours. The starting carbon monoxide pressure was 550 p.s.i.g. at room temperature and the final pressure was less than 150 p.s.i.g. The autoclave was opened, the contents filtered, and the solvent evaporated from the filtrate under reduced pressure. The product was identified as cumene chromium tricarbonyl.

Example V

In a 500 milliliter stainless steel pressure vessel was placed 9.44 grams (0.04 mole) of bis(toluene) vanadium and 200 milliliters of nitrogen purged toluene. The above operation was conducted in a dry box under a nitrogen atmosphere. The vessel was closed in a dry box, placed in a rocking furnace and pressurized with 750 p.s.i.g. of carbon monoxide and 150 p.s.i.g. of hydrogen giving a total pressure of 900 p.s.i.g. The vessel was rocked for ten minutes at 20° C. during which time the pressure dropped to 840 p.s.i.g. The pressure vessel was then heated at 45° C. for 30 minutes. After cooling to room temperature, a total pressure drop of 190 p.s.i.g. has occurred. The vessel was opened in the dry box under a nitrogen atmosphere and the liquid containing the ditoluene divanadium hexacarbonyl as suspended solid was decanted into a flask and evaporated to dryness under a partial vacuum. Ditoluene divanadium hexacarbonyl was isolated as a finely divided red solid.

Ditoluene divanadium hexacarbonyl is a red solid slightly soluble in diethyl ether, chloroform, carbon disulfide, and toluene. It is sensitive to oxidation, changing to a black solid on exposure to air.

The compounds of this invention may be used to deposit a metallic mirror on various substrates. All of the compounds of this invention may be decomposed by employment of temperature in excess of 400° C. to form a metallic film or coating on materials such as glass, glass cloth, resins and metals. The metallic coatings provide electrically conducting coatings for such substances as glass cloth and provide corrosion resistant coatings for metals.

For coating glass cloth, a quantity of an arene metal carbonyl of this invention is sealed in an evacuated glass tube with a strip of cloth which has previously been dried in an oven at 150° C. for one hour; the tube is then heated to about 400° C. for one hour, cooled and opened. The glass cloth increases in weight by up to about 0.01 gram per gram of glass cloth and has a resistivity of several ohms per centimeter. Thus, a conducting cloth may be prepared which is useful for the reduction of static charge.

For example, a piece of thin copper wire about 43 millimeters long, a piece of sapphire rod 3 millimeters in diameter and 22 millimeters long, and a rectangular piece of glass cloth about 50 x 20 millimeters average dimension were placed in a 30 millimeter O.D. glass tube 2 feet long. A glazed porcelain boat containing 1 gram of toluene chromium tricarbonyl was placed in the tube which was then purged with argon and heated to 300° C. The boat was then pushed into the hot zone. After 45 minutes, a chromium plate was deposited on the objects as well as on the walls of the tube, and toluene was condensing on the cool downstream end of the tube.

The glass cloth had attained a very dark metallic luster and would conduct an electric current. The copper wire had a dull, even coating of chromium metal over its entire length. The sapphire rod had an even, bright, shiny surface coating of chromium metal and this chromium plate had a resistance of 150 ohms from one end to the other.

What is claimed is:

1. A process for the production of stable arene metal carbonyls comprising contacting at a temperature between about −50° C. and 350° C. a bis(arene hydrocarbon) metal compound with carbon monoxide under pressure, which process is represented by the equation:

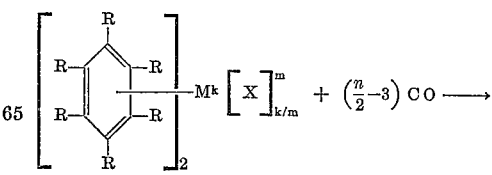

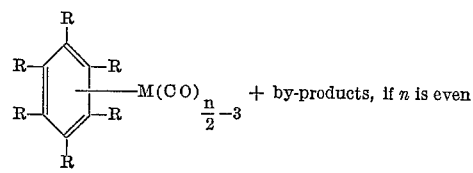

and by the equation:

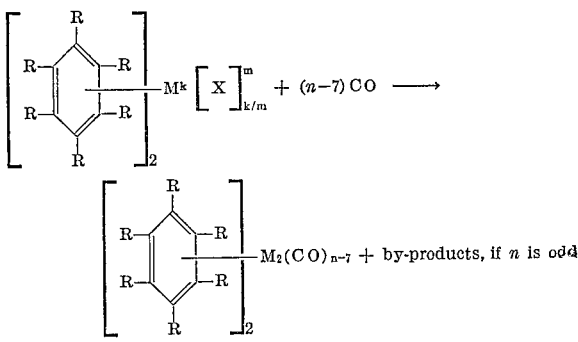

wherein:
(1) M is selected from the group consisting of vanadium, niobium, tantalum, chromium, molybdenum, tungsten, manganese, rhenium, iron, ruthenium, osmium, cobalt, rhodium and iridium;
(2) each R group is selected from the class consisting of hydrogen, lower alkyl, phenyl, phenyl lower alkyl and lower alkylphenyl;
(3) X is an anion selected from the group consisting of chloride, bromide, hydroxide, acetate, chloroacetate, tetraphenylboron, reineckate, tetrabromoaluminate and picrate;
(4) $k$ is the ionic charge of the bis(arene hydrocarbon) metal moiety and has integral values selected from the group consisting of zero, 1 and 2;
(5) $m$ is the ionic charge of the anion X;
(6) $k/m$ is the number of anions bonded to the bis(arene hydrocarbon) metal moiety;
(7) $n$ is an integer defined by the equation $n=G-A$;
(8) A is the atomic number of M;
(9) G is the atomic number of the next higher rare gas with respect to said metal M, and
(10) in the reaction product, each metal atom is bonded to only one arene organic group.

2. Process in accordance with claim 1 wherein the reaction is carried out in an inert liquid organic solvent.

3. Process in accordance with claim 1 wherein the integer $k$ has a value from 1 to 2, inclusive, and said bis(arene hydrocarbon) metal compound and said carbon monoxide are contacted with a metallic reducing agent selected from the group consisting of aluminum, magnesium and zinc.

4. A process for the production of stable arene metal carbonyls comprising contacting at a temperature between about 35° C. and about 45° C. a bis(arene hydrocarbon) metal compound with carbon monoxide under pressure, which process is represented by the equation

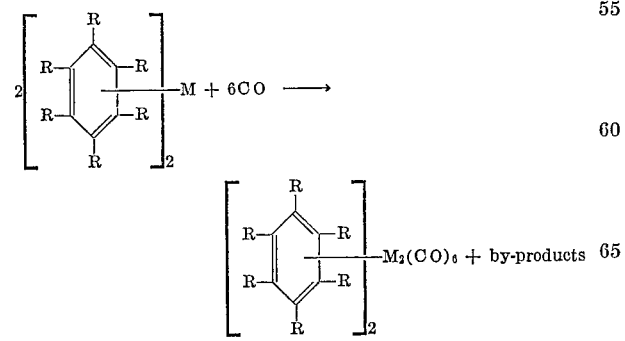

wherein M is a metal from group V-B of the periodic table and each R group is selected from the class consisting of hydrogen, lower alkyl, phenyl, phenyl lower alkyl and lower alkylphenyl.

5. Process in accordance with claim 4 wherein M is vanadium.

6. A process for the production of stable arene metal carbonyls comprising contacting at a temperature between about 200° C. and about 300° C. a bis(arene hydrocarbon) metal compound with carbon monoxide under pressure, which process is represented by the equation

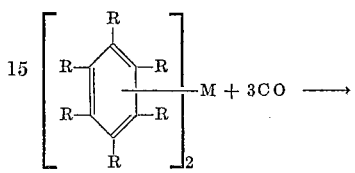

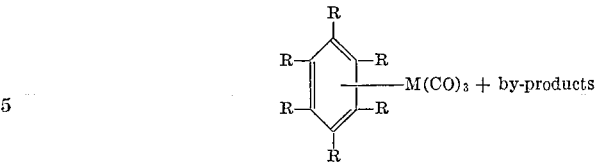

wherein M is a metal from Group VI-B of the periodic table and each R group is selected from the class consisting of hydrogen, lower alkyl, phenyl, phenyl lower alkyl and lower alkylphenyl.

7. Process in accordance with claim 6 wherein M is chromium.

8. A process for producing toluene chromium tricarbonyl which comprises contacting at a temperature between about 200° C. and about 300° C. and in toluene solvent bis(toluene) chromium with carbon monoxide under pressure.

9. A process for producing cumene chromium tricarbonyl which comprises contacting at a temperature between about 200° C. and about 300° C. and in cumene solvent bis(cumene) chromium with carbon monoxide under pressure.

10. A process for producing ditoluene divanadium hexacarbonyl which comprises contacting at a temperature between about 35° C. and about 45° C. and in toluene solvent bis(toluene) vanadium with carbon monoxide under pressure.

References Cited in the file of this patent

UNITED STATES PATENTS

| | | |
|---|---|---|
| 2,818,416 | Brown et al. | Dec. 31, 1957 |
| 2,898,354 | Shapiro | Dec. 8, 1959 |
| 2,953,586 | Hafner et al. | Sept. 20, 1960 |

OTHER REFERENCES

Fischer et al.: "Zeitschrift für Naturforschung," vol. 10b, pages 140–143 (1955).

Piper et al.: "Inorg. Nucl. Chem.," vol. 3, 1956, pages 104–124.

Fischer et al.: "Ber. Deut. Chem.," vol. 90, Nov. 30, 1957, pages 2532–2535.